Feb. 9, 1971 V. E. LOUGHLIN 3,561,236
LOCK FOR BOLTED-ON EQUIPMENT
Filed July 24, 1969

INVENTOR.
VINCENT E. LOUGHLIN
BY
Curtis, Morris & Safford
ATTORNEYS

United States Patent Office 3,561,236
Patented Feb. 9, 1971

3,561,236
LOCK FOR BOLTED-ON EQUIPMENT
Vincent E. Loughlin, 83—17 124 Place,
Kew Gardens, N.Y. 11415
Filed July 24, 1969, Ser. No. 844,435
Int. Cl. E05b 73/00; F16b 41/00
U.S. Cl. 70—232
8 Claims

ABSTRACT OF THE DISCLOSURE

A mounting lock for typewriters and like equipment, to secure the equipment so effectively to a base structure on which it is mounted so that it cannot be readily removed by thieves and carried off. The device embodies a guard in which a removable fastening is enclosed and protected from turning tools, and provides for jamming the enclosure in place by the shackle of a padlock or the like.

---

This invention relates to a lock for securing equipment, such as typewriters, adding machines, sewing machines, etc., to desks, tables, benches or other fixed bases which either may be too cumbersome to be removed by a thief or are securely anchored so that they cannot be carried off.

In spite of the fact that a need has been long recognized for a theft-proof anchoring device, the increasing value of small machines, especially office machines such as typewriters, duplicating machines, adding machines, etc., has led to an increase in the number of thefts of such machines—in many cases by merely picking up the machine and carrying it away, sometimes pretending that it is to be taken to a central servicing shop.

The prior art has many devices for securing such machines, sometimes by bolting them in place and distorting the threads, so that the bolts cannot be unscrewed, sometimes by tack welding or brazing the bolts, so that they cannot come unscrewed; and in many instances by means of a tumbler lock; but such devices as have been available have been either too expensive or too cumbersome in use, so that the need for a satisfactory solution to this problem still remains.

I have found that the problem can be easily and inexpensively solved without the use of expensive procedures or equipment. By bolting the machine to a fixed base with bolts extending through the base and into a part of the machine which rests on the base and, therefore, covers the bolt when the machine is in place. Such bolt extends through the base and on the opposite side is secured, with or without washers or the like, by a nut which can be turned to clamp more tightly against the base and hold the machine tightly positioned or to loosen it.

Beyond this nut (in which term I include such washers and accessories as may be used with it) the bolt advantageously has a forged head smoothly rounded so that it offers no easy means of holding or turning the bolt from the outside; and, under the head, advantageously, is a cup washer which can be turned freely on the bolt and which preferably has a cover plate welded or cemented on the top to prevent access to the head of the bolt by a wrenching tool.

In the accompanying drawings where I have shown a preferred embodiment of the invention:

Figure 1:
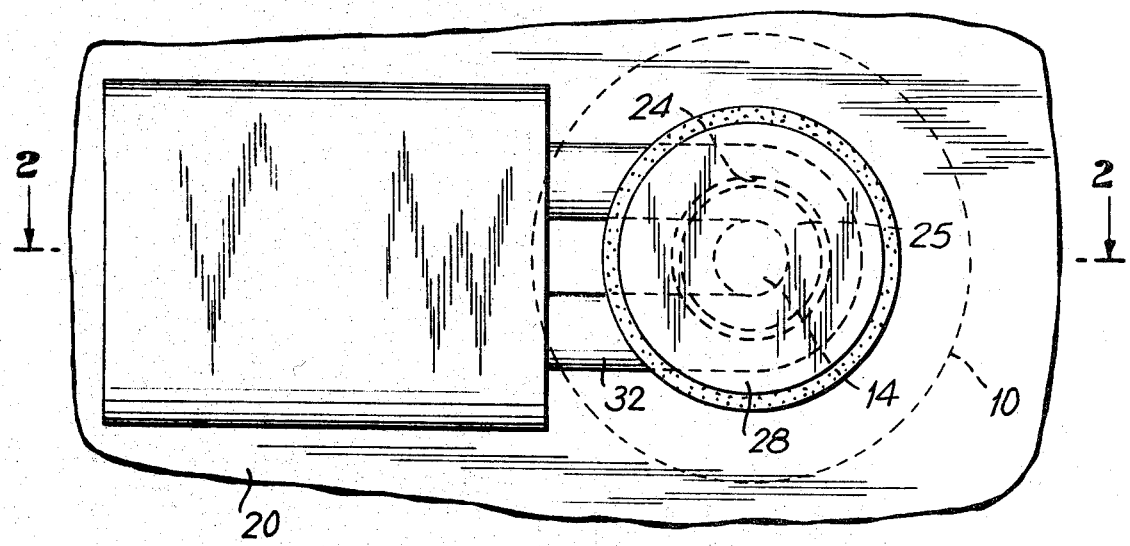
FIG. 1 is a diagrammatic view in vertical section of a structure applying my invention to locking a typewriter or similar equipment.
Figure 2:
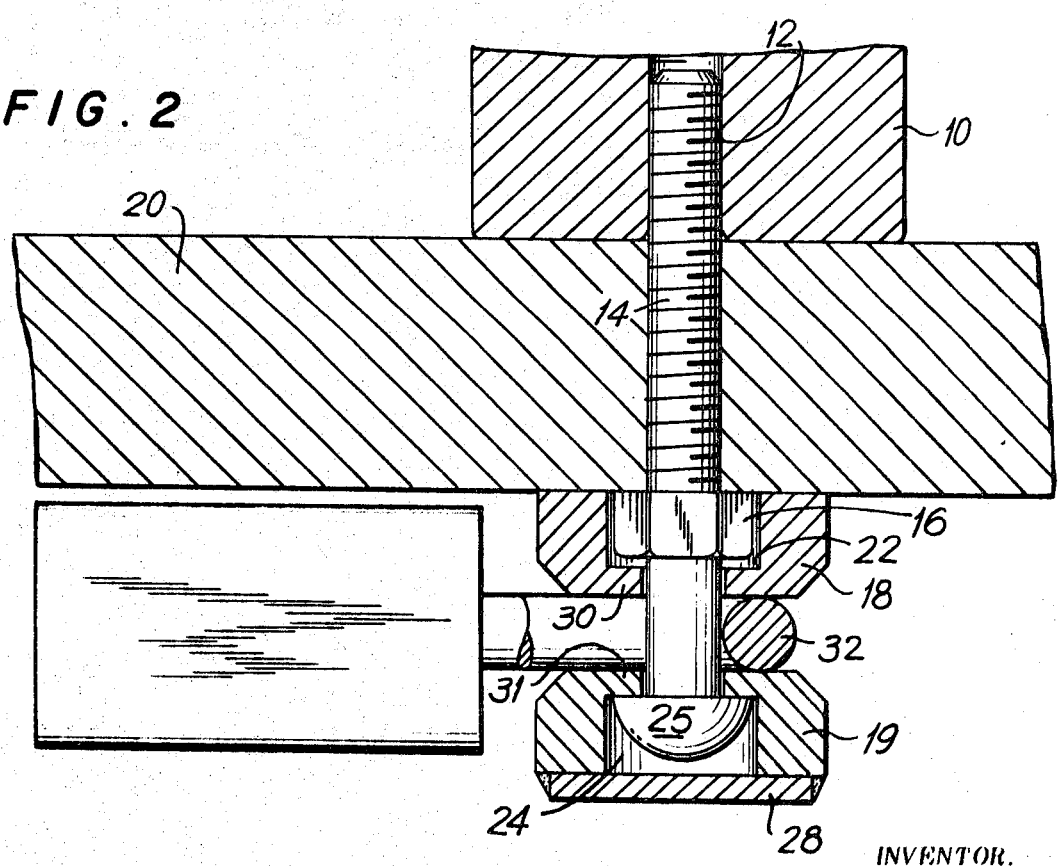
FIG. 2 is a bottom plan view of the same.

The foot of a typewriter or other equipment to be locked is shown at 10 with the remainder of the equipment broken away to simplify the drawing. Whatever the equipment, its foot 10 is drilled and threaded as indicated at 12 to receive the bolt 14 which is provided with a flange at 16, e.g., a nut screwed onto its thread to serve as a second abutment spaced from the first to receive a padlock shackle between them.

Above this nut 16 on the bolt 14 two cup washers, 18 and 19, are shown; 18 is open on the top in the position shown, except as it is pulled up against the bottom of the fixed base 20. Its recess 22 is large enough so that it can turn freely when it is over the nut 16, as shown in FIG. 1.

A similar recess 24 in the washer 19 receives the head 25 of the bolt, a peripheral, extended flange which serves as an abutment to engage the cup washer 19.

On the bottom face of the washer 19 is secured, e.g., by welding or brazing or cementing, a plate 28 over the recess 24, to enclose a chamber in which the head 25 can be freely rotated and in which it is protected against engagement by any tool for holding or turning the bolt.

The head 25 may be slotted for a screw driver, or have polygonal form to engage an end-, or socket-, wrench, but can be smoothly rounded and gripped with the fingers, pliers or a pipe wrench to insert it into the threaded hole 12, after which nut 16 can be set down hard with a wrench.

The threaded bolt and nut are representative of a variety of wedging means by which motion resulting from force applied transverse to the bolt is converted to axial force with high mechanical advantage.

The distance from the top of the nut 16, or other flange, to the bottom of the head 25, or other abutment on the end of bolt 14 approximates, and is not greater than, the sum of the thicknesses of the flanges 30 and 31 on the washers 18 and 19 so that when the washers respectively are clamped against the base 20 and the head 25, the distance between them is equal to the thickness of the shackle 32 of a padlock, shown in FIG. 1, and is at least sufficient so that when the shackle is removed and the washer 18 drops down against the washer 19, a substantial thickness of the nut 16 is exposed, sufficient to be engaged by a wrenching tool for unscrewing the bolt.

I claim:
1. A fastening for locking machines to a fixed base and against theft, which comprises
 (a) a bolt having
  (i) an abutment extending outward from
  (ii) a narrower neck,
  (iii) an adjustable flange near said abutment but spaced therefrom, adapted to engage the fixed base,
  (iv) means on said bolt adapted to anchor it at a predetermined position on the machine, and
  (v) wrench-engaging means for adjusting said flange relative to the bolt, whereby to adjust the space between said abutment and said flange in accordance with the thickness of a padlock shackle; and
 (b) guard means for said wrench-engaging means adapted to block a wrenching tool from engagement with said wrench-engaging means, but retractable along the bolt to expose said wrench-engaging means to wrenching by such tool; and
 (c) a padlock having
  (i) a shackle embracing said bolt and jammed between said abutment and said guard means, whereby to block retraction of said guard means; said shackle being removable from the space between the abutment and guard means to free the guard means for retraction along the bolt.

2. A fastening as defined in claim 1 in which the abutment is a head forged on one end of the bolt, the flange is a nut adjustable along the shank of the bolt near its head, wedging means is provided by the bolt and nut whereby the wrenching tool is adapted to produce relative movement therebetween to clamp the machine to the base.

3. A fastening as defined in claim 1 in which the guard means is a cup washer adapted to fit over and turn freely on the adjustable flange and having its rim sufficiently deep to block engagement of a tool wtih the wrench-engaging means.

4. A fastening as defined in claim 1 in which the means to anchor the bolt comprises a threaded end on the bolt and a mating threaded hole in a part of the machine which bears on said base, said base having a hole therethrough aligned with said threaded hole, and said bolt extends through said hole with its abutment projecting beyond the base on its opposite side from the machine.

5. A fastening as defined in claim 4 in which the adjustable flange is a nut threaded on said bolt, whereby to clamp the fixed base between it and the machine.

6. A fastening for holding machines against theft which comprises a bolt having one end threaded for engagement in a threaded part of the machine and a first abutment for engaging a fixed base to which the machine is to be secured, and a second abutment spaced beyond the first, a rotatable head at the outer end of the bolt having a bore to receive and turn freely on the shank of the bolt, the first abutment being a nut threaded on the bolt, a cup washer adapted to receive and surround said nut to prevent wrenching it, the recess of the cup washer being substantially larger than the nut, whereby the washer is rotatable relative to the nut, and a padlock with its shackle held between said head and said washer, and being of thickness adapted to hold said washer up to said nut so that the nut is enclosed and cannot be turned by a tool inserted under the washer, but the thickness being sufficient so that, when the shackle is removed, there is spaced for the cup washer to be axially retracted to expose said wrenching portion of the nut to allow unscrewing and tightening.

7. A fastening as defined in claim 6 wherein the rotatable head is a cup washer receiving the second abutment and which further comprises a cover secured over the recess of the cup washer to prevent access to the second abutment of the bolt.

8. A fastening for holding machines against theft which comprises a bolt for securing the machine to a support, a portion of said bolt being secured in one of said support and machine and extending through a hole in the other, said bolt having a wrenching head adjacent its distal end and adapted to prevent axial removal of the bolt from the hole, an outer head on the bolt beyond the wrenching head a distance substantially equal to the sum of the thicknesses of the shackle of a padlock plus any spacers between the outer head and the support, one of such spacers being a cup washer with the wrenching head of the bolt in its cup, whereby, when the padlock is set with its shackle between said washer and said outer head, it will jam the cup washer onto and against the support, with said wrenching head surrounded by said cup washer, the washer being rotatable with respect to said wrenching head and any play in said washer being less than sufficient to allow access of a wrenching tool to said wrenching head when the padlock is set.

References Cited

UNITED STATES PATENTS

| | | | |
|---|---|---|---|
| 1,430,707 | 10/1922 | Weaver | 70—232X |
| 1,957,557 | 5/1934 | Schwahn | 70—232 |
| 2,339,879 | 1/1944 | Reyburn | 70—259 |
| 2,983,133 | 5/1961 | Hruby | 70—58 |

MARVIN A. CHAMPION, Primary Examiner

A. G. CRAIG, Jr., Assistant Examiner